US009755501B2

(12) United States Patent
Gopinath et al.

(10) Patent No.: US 9,755,501 B2
(45) Date of Patent: Sep. 5, 2017

(54) OVERVOLTAGE SNUBBER FOR GRID TIE INVERTER

(71) Applicant: BLOOM ENERGY CORPORATION, Sunnyvale, CA (US)

(72) Inventors: Rajesh Gopinath, Sunnyvale, CA (US); Arne Ballantine, Palo Alto, CA (US); Carl Cottuli, Franklin, MA (US)

(73) Assignee: BLOOM ENERGY CORPORATION, Sunnyvale, CA (US)

( * ) Notice: Subject to any disclaimer, the term of this patent is extended or adjusted under 35 U.S.C. 154(b) by 355 days.

(21) Appl. No.: 14/566,267

(22) Filed: Dec. 10, 2014

(65) Prior Publication Data

US 2016/0172963 A1  Jun. 16, 2016

(51) Int. Cl.
*H02H 7/00* (2006.01)
*H02M 1/34* (2007.01)
*H02M 7/217* (2006.01)

(52) U.S. Cl.
CPC ............. *H02M 1/34* (2013.01); *H02M 7/217* (2013.01); *H02M 2001/344* (2013.01)

(58) Field of Classification Search
CPC ........ H02M 5/40; H02M 5/42; H02M 7/7575; H02H 7/261; H02H 7/268; H02H 7/1255
USPC ................................................ 363/34–37, 53
See application file for complete search history.

(56) References Cited

U.S. PATENT DOCUMENTS

| 4,545,464 A * | 10/1985 | Nomura ................... B66B 1/30 187/296 |
| 7,705,490 B2 | 4/2010 | Srinivasan et al. |
| 7,713,649 B2 | 5/2010 | Hickey et al. |
| 8,232,676 B2 | 7/2012 | Gurunathan et al. |
| 8,535,836 B2 | 9/2013 | Ballantine et al. |
| 2006/0152085 A1* | 7/2006 | Flett ......................... B60L 9/30 307/75 |
| 2012/0098336 A1 | 4/2012 | Gurunathan et al. |

* cited by examiner

*Primary Examiner* — Jeffrey Gblende
*Assistant Examiner* — Afework Demisse
(74) *Attorney, Agent, or Firm* — The Marbury Law Group PLLC

(57) ABSTRACT

An overvoltage snubber circuit configured to receive an alternating current (AC) overvoltage includes a first rectifier configured to convert the AC overvoltage to a direct current (DC) overvoltage, a chopper circuit electrically connected to the first rectifier and configured to break up the DC overvoltage and to output a variable DC voltage, and a resistor electrically connected to the chopper circuit and configured to dissipate energy of the variable DC voltage.

5 Claims, 5 Drawing Sheets

OVERVOLTAGE SNUBBER FOR GRID TIE INVERTER

FIELD

The present disclosure is directed to circuits, such as an overvoltage snubber circuit for a fuel cell power generator system.

BACKGROUND

Electrical power systems can be used to provide electrical power to one more loads such as buildings, appliances, lights, tools, air conditioners, heating units, factory equipment and machinery, power storage units, computers, security systems, etc. The electricity used to power loads is often received from an electrical grid. However, the electricity for loads may also be provided through alternative power sources such as fuel cells, solar arrays, wind turbines, thermo-electric devices, batteries, etc. The alternative power sources can be used in conjunction with the electrical grid, and a plurality of alternative power sources may be combined in a single electrical power system. Alternative power sources are generally combined after conversion of their direct current (DC) output into an alternating current (AC).

Operating individual distributed generators, such as fuel cell generators, both with and without a grid reference and in parallel with each other without a grid reference is problematic in that switch-over from current source to voltage source must be accommodated. Additionally, parallel control of many grid independent generators can be problematic. To address the mode-switch-over issue, a double-inverter arrangement may be utilized. This allows one inverter to be used in grid tie and a second inverter to be used with the stand-alone load. An exemplary double-inverter arrangement with a load dedicated inverter that is located internally in an input/output module of a solid oxide fuel cell (SOFC) system is described in U.S. patent application Ser. No. 12/149,488 (filed May 2, 2008 and entitled "Uninterruptible Fuel Cell System"), the disclosure of which is incorporated herein by reference in its entirety for all purposes.

SUMMARY

An overvoltage snubber circuit configured to receive an alternating current (AC) overvoltage, including a first rectifier configured to convert the AC overvoltage to a direct current (DC) overvoltage, a chopper circuit electrically connected to the first rectifier and configured to break up the DC overvoltage and to output a variable DC voltage, and a resistor electrically connected to the chopper circuit and configured to dissipate energy of the variable DC voltage.

DETAILED DESCRIPTION

Figure 1:
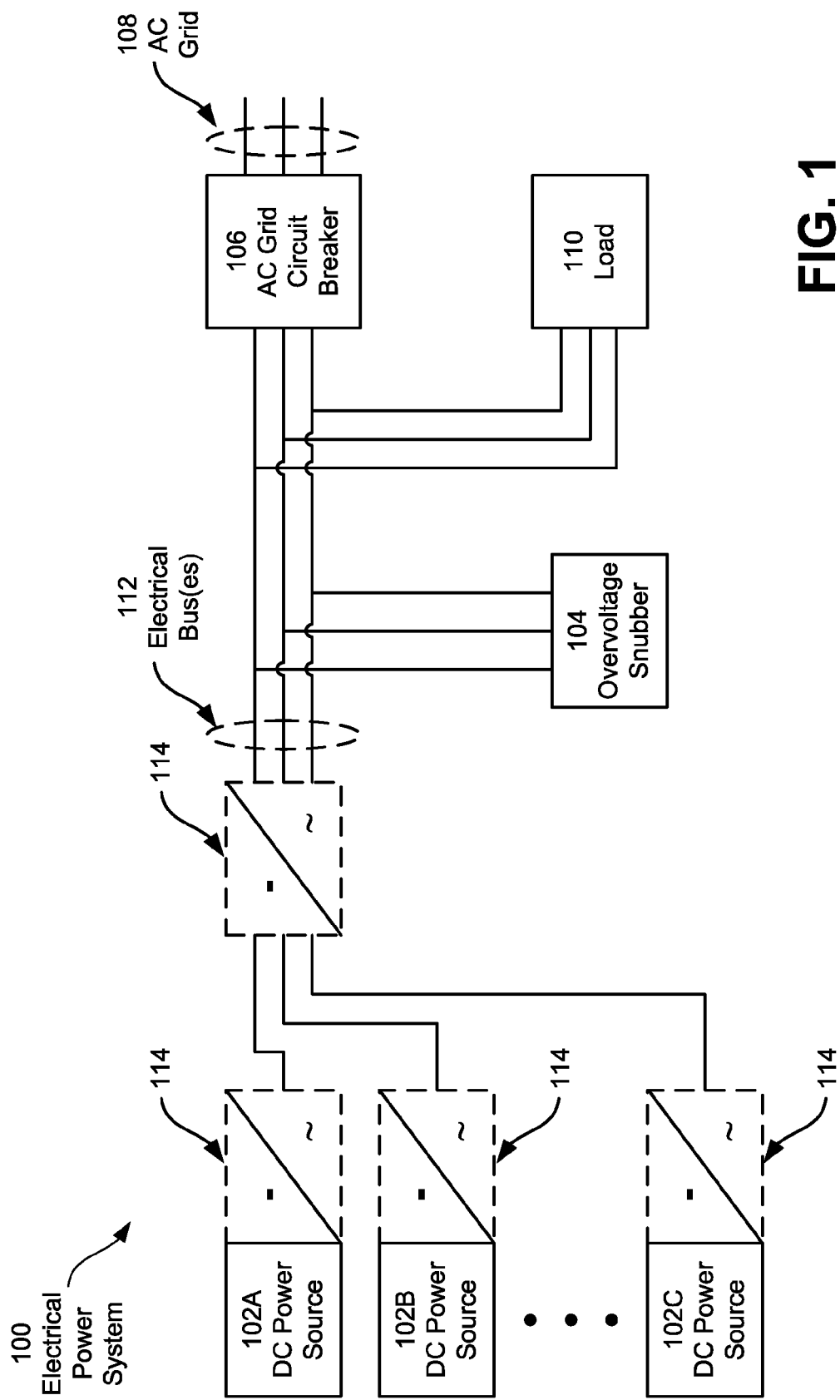
FIG. 1 is a block diagram illustrating a system including an overvoltage snubber according to an embodiment.

The present inventors realized that opening of a grid side circuit breaker, such as during a mode-switch-over, can cause an overvoltage swell on a main electrical bus of an electrical utility customer. A magnitude of the overvoltage swell can depend on the DC voltage of one or more of the inverters. The magnitude of the overvoltage could be, for example, as high as 150% of the root mean square of a nominal voltage and last for multiple cycles (e.g. two to ten 60 Hz cycles).

The excess power of the overvoltage swell provided to the customer via the inverter(s) should be absorbed or dissipated. Traditional surge protection devices (e.g. metal-oxide varistors or transient voltage surge suppressors) clamp overvoltage swells at too high voltage levels to provide adequate protection from damage to the main electrical bus and the electrical utility customers connected to it.

Embodiments are generally directed to architectures and methods of an overvoltage snubber. The overvoltage snubber is preferably connected to an electrical bus between a direct current (DC) power source, from which DC power is converted to alternating current (AC) power, and a load. An AC grid may also be electrically connected to the DC power source via an AC grid circuit breaker that may interrupt the connection between the AC grid and the DC power source. Interrupting the connection between the AC grid and the DC power source may cause an AC overvoltage to be directed toward the load, which may be damaged when receiving the AC overvoltage. The overvoltage snubber may temper the AC overvoltage thereby producing an snubbed AC voltage manageable by the load.

In an embodiment, the overvoltage snubber may receive the AC overvoltage. The overvoltage snubber may include a first rectifier that may convert the AC overvoltage to a DC overvoltage, a chopper circuit that may break up the DC overvoltage and output a variable DC voltage, and a resistor that may dissipate energy of the variable DC voltage.

In an embodiment, the over overvoltage snubber may include a pre-charge circuit which may reduce a rate of increase of current in the overvoltage snubber in response to the overvoltage snubber receiving an AC overvoltage.

In an embodiment, the overvoltage snubber may include a controller electrically connected to the chopper circuit and configured to signal the chopper circuit to change a state of the chopper circuit, such that the chopper circuit may induce the overvoltage snubber to receive the AC overvoltage when the chopper circuit is in a closed state and configured to break up the DC overvoltage by switching between the closed state and an open state.

In an embodiment, the resistor may dissipate energy of the variable DC voltage to approximately or below a designated threshold that indicates a power level manageable by a load.

In an embodiment, the overvoltage snubber may include a filter capacitor electrically connected to the chopper circuit and that may smooth out the DC overvoltage by storing energy of the DC overvoltage.

In an embodiment, the first rectifier may be electrically connected to the resistor and may convert the variable DC voltage to a snubbed AC voltage.

Electrical power systems having multiple power sources must generally balance the power levels provided to a load in the system during multiple operating modes of such electrical power systems. The multiple power sources may include an alternating current (AC) grid that may be a primary power source, and a direct current (DC) power source that may be an alternative or secondary power source, such as a fuel cell power generator like the ones mentioned above. During various operating modes of the electrical power system, the DC power source may provide electrical power to support the load and/or the AC grid. Generally, the load, connected to the electrical power system that provides power to the load via an AC grid and a DC power source, requires receiving the power as an alternating current. The power from the AC grid may already be in the right form for delivering to the load. The power from the DC power source may be converted to an alternating current, either by components of the DC power source or components of the electrical power system external to the DC power source. Regardless of how the electrical power is conditioned to be an alternating current, the final delivery of the electrical power to the load may be in this form. The same goes for providing AC power to the AC grid from the DC power sources.

The power levels for supporting the load and AC grid may be too high for the load alone. During an operating mode where the DC power source is supporting the load and the AC grid, should the electrical connection between the DC power source and the AC grid be interrupted, for example when a circuit breaker of the AC grid opens, the power to the AC grid may be redirected to the load. The excess power, manifested as an overvoltage, delivered to the load may cause a power spike at the load too great for the load to handle, resulting in damage to the load.

To help avoid the overvoltage causing such damage, an overvoltage snubber may be connected between the load and the power sources to intercept and reduce the AC overvoltage to an appropriate level alternating current for supporting the load. The overvoltage snubber may employ a power chopper to extract energy from an electrical bus connecting the load to the DC power source supplying the AC overvoltage, and may step-down the AC voltage and dissipate some of the excess power of the AC overvoltage.

Referring to FIG. 1, an electrical power system 100 according to an embodiment may include a DC power source 102, an overvoltage snubber 104, an AC grid circuit breaker 106, an AC power grid 108, and a load 110. It should be understood that the electrical power system 100 is simplified for ease of explanation, and that the electrical power system 100 may include other components and configurations, such as a DC/AC inverter 114 located in each DC power source 102 and/or on one or more electrical busses 112 between the DC power sources 102 and the overvoltage snubber 104. In an embodiment, multiple DC power sources 102A, 102B, and 102C may be connected in parallel to the overvoltage snubber 104, the AC grid circuit breaker 106, and the load 110 via one or more of the inverters 114 and electrical busses 112. The DC power sources 102A, 102B, and 102C may be connected to the AC grid 108 via the AC circuit breaker 106. A direct current may be provided by one or more of the DC power sources 102A, 102B, and 102C, which is converted to AC power by the inverter(s) 114 and provided to the load 110 and the AC grid 108. The AC power provided to the load 110 and the AC grid 108 may be divided and distributed to each by various known methods.

The AC grid circuit breaker 106 may electrically connect the AC grid 108 and the electrical bus(es) from the one or more of the DC power sources 102A, 102B, and 102C, and allow the AC power provided from the DC power sources 102A, 102B, and 102C and the inverter(s) 114 to pass to the AC grid 108. In an embodiment, the AC grid circuit breaker 106 may unidirectional (e.g., allowing power to flow to or from the AC grid 108) or bidirectional (e.g., allowing power to flow to and from the AC grid 108). In an embodiment where the AC grid circuit breaker 106 is unidirectional, allowing the power to flow to the AC grid 108, other connections may electrically connect the AC grid 108 to the components of the electrical power system 100. Such other connections may include direct connections or connections via another unidirectional AC grid circuit breaker (not shown) allowing the power to flow from the AC grid 108. The AC grid circuit breaker 106 may be configured to protect the AC grid 108 from damage caused by an overload or a short circuit by detecting a fault condition and interrupting the AC flow. In response to detecting a fault condition, contacts within the AC grid circuit breaker 106 may open to interrupt the circuit connecting the AC grid 108 and one or more of the DC power sources 102A, 102B, and 102C. An open state of the AC grid circuit breaker 106 may indicate that there is no electrical connection to allow the AC flow to the AC grid 108 from one or more of the DC power sources 102A, 102B, and 102C. In an embodiment, the AC grid circuit breaker 106 may be set to an open state manually to stop the AC flow to the AC grid 108, for example for the purpose of conducting maintenance of the AC grid 108. The open AC grid circuit breaker 106 may be set to a closed state, closing the previously opened contacts, to resume the AC flow to the AC grid 108.

As discussed above, some modes of the electrical power system 100 may include one or more of the DC power sources 102A, 102B, and 102C providing DC power to the inverter(s) 114, which in turn provide AC power to the load 110 and the AC grid 108. In such modes of the electrical power system 100, the total AC power provided to the load 110 and the AC grid 108 may be more AC power than the load 110 is configured to handle on its own. During one of these modes of the electrical power system 100, the AC grid circuit breaker 106 may switch from a closed state to an open state disrupting the AC flow to the AC grid 108. The speed with which the AC grid circuit breaker 106 may open may be too quick for the DC power sources 102A, 102B, and 102C to react to their disconnection from the AC grid 108 and reduce their AC power output from the inverter(s) 114 to the electrical power system 100. For example, it may take approximately three cycles before the DC power sources 102A, 102B, and 102C may identify that they are no longer tied to the AC grid 108 and adjust their power output. Without being connected to the AC grid 108, the power meant for the AC grid 108 may flow to the load 110 in addition to the power meant for the load 110. The additional power meant for the AC grid 108 but flowing to the load 110 may increase the total power to the load 110 beyond the load's capacity for handling power. This excess power may damage the load 110.

The overvoltage snubber 104 may be connected to the electrical bus(es) 112 between the DC power sources 102A, 102B, and 102C and the load 110. In response to the voltage on the bus(es) 112 increasing above a designated threshold, the overvoltage snubber 104 may siphon portions of the AC power from the bus(es) 112 to reduce the amount of AC power flowing to the load 110. The increase in voltage on the bus(es) 112 may be caused by the loss of the electrical connection to the AC grid 108 changing the electrical potential across the electrical power system 100. As will be described in further detail below, the overvoltage snubber 104 may step-down and/or dissipate at least some of the excess AC power flowing to the load 110, thereby reducing the total AC power received by the load 110. The overvoltage snubber 104 may reduce the AC power to the load 110 as long as the voltage on the bus(es) 112 is above the designated threshold. The DC power sources 102A, 102B, and 102C may adjust their power outputs in response to the loss of connection to the AC grid 108, which may reduce the voltage on the bus(es) 112 below the designated threshold. In response to the voltage on the bus(es) 112 falling below the designated threshold, the overvoltage snubber 104 may cease siphoning AC power from the bus(es) 112. The designated threshold may be determined to be a measure of electrical power (e.g. power, voltage, and/or current) coinciding with or less than a limit of electrical power for the load 110 to protect the load 110 from the overvoltage.

The above example is described in relation to operating modes of the electrical power system 100 where the DC power sources 102A, 102B, and 102C provide AC power to the load 110 and the AC grid 108. This example is used for ease of explanation, but it should be understood that the overvoltage snubber 104 may be employed in a similar manner in the electrical power system 100 for any occurrence of excess AC power flow from one or more of the DC power sources 102A, 102B, and 102C to the load 110.

Figure 2:
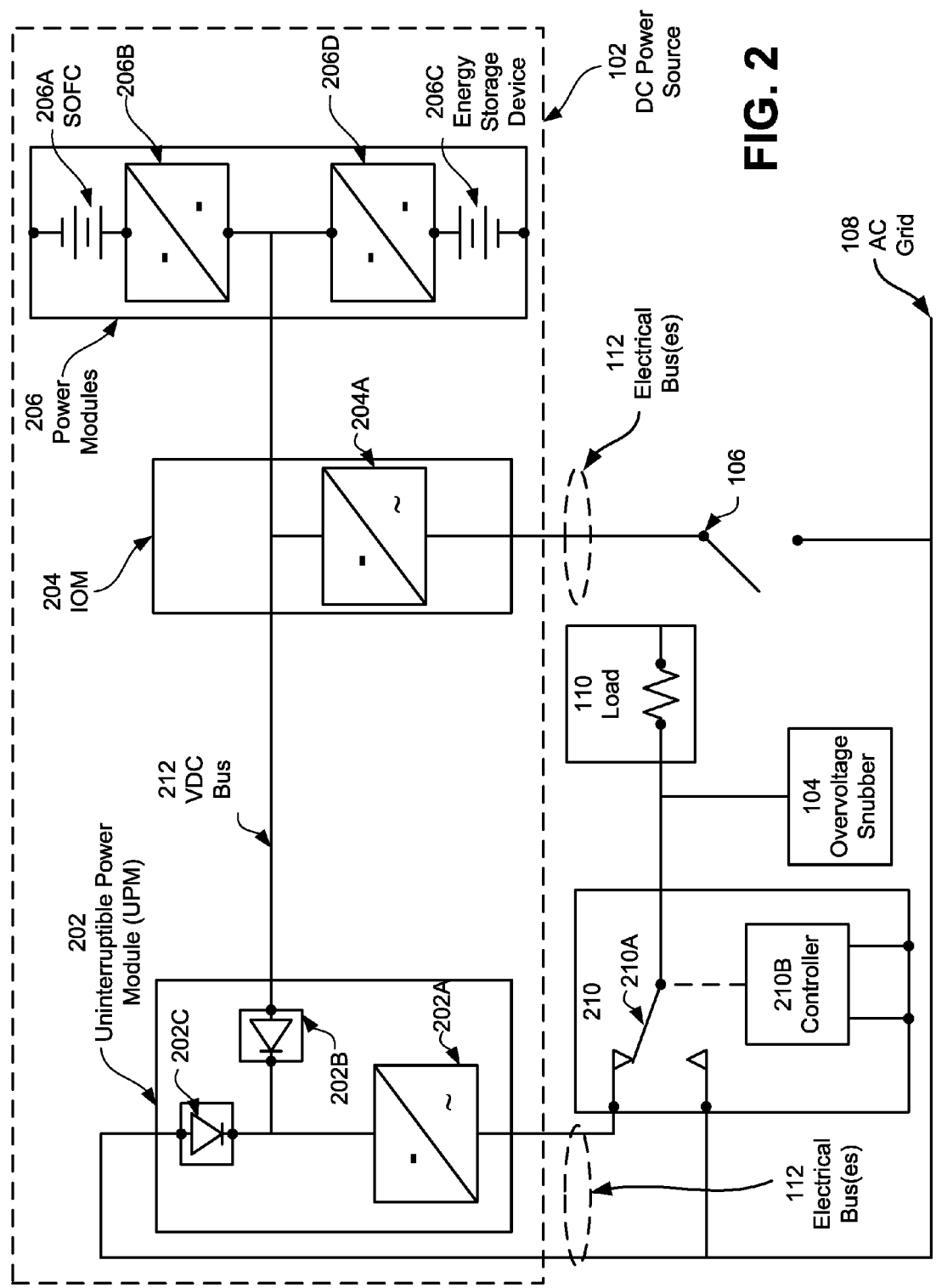
FIG. 2 is a block diagram illustrating a system including an overvoltage snubber according to an embodiment.

FIG. 2 illustrates an embodiment of a fuel cell power generator system which includes the overvoltage snubber 104. Referring to FIG. 2, a DC power source 102, such as a fuel cell system, according to an embodiment includes an uninterruptible power module (UPM) 202, an input/output module (IOM) 204, and one or more power modules 206. Preferably, the power module 206 comprises a first housing, the IOM 204 comprises a second housing which is separate from the first housing, and the uninterruptible power module 202 comprises a third housing which is separate from the first and the second housings. If there is more than one power module 206, for example six to ten modules 206, then each power module may comprise its own housing. Each housing may comprise a cabinet or another type of full or partial enclosure, for example the cabinet described in U.S. application Ser. No. 12/458,355, filed on Jul. 8, 2009, and incorporated herein by reference in its entirety. The modules may be arranged in one or more rows or in other configurations.

The UPM 202 includes at least one DC/AC inverter 202A. If desired, an array of inverters may be used. Any suitable inverter known in the art may be used. The UPM 202 optionally contains an input rectifier, such as an input diode 202B which connects to the output of a DC bus 212 from the power module(s) 206 and to the input of the at least one inverter 202A. The UPM also optionally contains a boost PFC rectifier 202C which connects to the output the electric AC grid 108, such as a utility grid, and to the input of the at least one inverter 202A.

The IOM 204 may comprise one or more power conditioning components. The power conditioning components may include components for converting DC power to AC power, such as a DC/AC inverter 204A (e.g., a DC/AC inverter described in U.S. Pat. No. 7,705,490, incorporated herein by reference in its entirety), electrical connectors for AC power output to the grid, circuits for managing electrical transients, a system controller (e.g., a computer or dedicated controller device or circuit), etc. The power conditioning components may be designed to convert DC power from the fuel cell power modules to different AC voltages and frequencies. Designs for 208V, 60 Hz; 480V, 60 Hz; 415V, 50 Hz and other common voltages and frequencies may be provided.

Each power module 206 cabinet is configured to house one or more hot boxes. Each hot box contains one or more stacks or columns of fuel cells 206A (generally referred to as "segments"), such as one or more stacks or columns of solid oxide fuel cells having a ceramic oxide electrolyte separated by conductive interconnect plates. Other fuel cell types, such as PEM, molten carbonate, phosphoric acid, etc. may also be used.

Fuel cells are often combined into units called "stacks" in which the fuel cells are electrically connected in series and separated by electrically conductive interconnects, such as gas separator plates which function as interconnects. A fuel cell stack may contain conductive end plates on its ends. A generalization of a fuel cell stack is the so-called fuel cell segment or column, which can contain one or more fuel cell stacks connected in series (e.g., where the end plate of one stack is connected electrically to an end plate of the next stack). A fuel cell segment or column may contain electrical leads which output the direct current from the segment or column to a power conditioning system. A fuel cell system can include one or more fuel cell columns, each of which may contain one or more fuel cell stacks, such as solid oxide fuel cell stacks.

The fuel cell stacks may be internally manifolded for fuel and externally manifolded for air, where only the fuel inlet and exhaust risers extend through openings in the fuel cell layers and/or in the interconnect plates between the fuel cells, as described in U.S. Pat. No. 7,713,649, which is incorporated herein by reference in its entirety. The fuel cells may have a cross flow (where air and fuel flow roughly perpendicular to each other on opposite sides of the electrolyte in each fuel cell), counter flow parallel (where air and fuel flow roughly parallel to each other but in opposite directions on opposite sides of the electrolyte in each fuel cell) or co-flow parallel (where air and fuel flow roughly parallel to each other in the same direction on opposite sides of the electrolyte in each fuel cell) configuration.

Power modules may also comprise other generators of direct current, such as solar cell, wind turbine, geothermal or hydroelectric power generators, in addition to or instead of the fuel cell segments.

The segment(s) 206A of fuel cells may be connected to the DC bus, 212 such as a split DC bus, by one or more DC/DC converters 206B located in the power module 206. Alternatively, the DC/DC converters 206B may be located in the TOM 204 instead of the power module 206.

The power module(s) 206 may also optionally include an energy storage device 206C, such as a bank of supercapacitors or batteries. Energy storage device 206C may also be connected to the DC bus 212 using one or more DC/DC converters 206D.

The UPM 202 is connected to an input/output module (TOM) 204 via the DC bus 212. The DC bus receives power from power modules 206.

The fuel cell system (e.g., the DC power source 102) and the AC grid 108 are electrically connected to the load 110 using a chopper unit 210. The load 110 may comprise any suitable load which uses AC power, such as one or more buildings, appliances, lights, tools, air conditioners, heating units, factory equipment and machinery, power storage units, computers, security systems, etc. The chopper unit 210 includes a switch 210A and controller 210B, such as a computer, a logic circuit, or other analog or digital controller device. The switch 210A may be a power semiconductor device (such as a Metal Oxide Semiconductor Field Effect Transistor (MOSFET) or an Insulated Gate Bipolar Transistor (IGBT)), an electrical switch (e.g., a switching circuit) or an electromechanical switch, such as a relay.

The controller 210B routes power to the load 110 either from the UPM 202 or from the AC grid 108 using switch 210A. The at least one fuel cell segment 206A and storage device 206C that from power module 206 are electrically connected in parallel to the at least one first inverter 204A in TOM and to the at least one second inverter 202A in the UPM 202. The at least one first inverter 204A is electrically connected to the load 110 through the electrical AC grid 108 using switch 210A in a first position. In contrast to the circuit shown in U.S. patent application Ser. No. 12/149,488 (filed May 2, 2008 and entitled "Uninterruptible Fuel Cell System"), the AC grid 108 is directly connected to the load 110 through the chopper unit 210 without passing through a bidirectional inverter. The at least one second inverter 202A is electrically connected to the load 110 with the switch 210A in a second position without using the electrical AC grid 108 (i.e., the output of the fuel cell segment 206A does not have to pass through the grid 114 to reach the load 110).

Thus, the controller 210B selects whether to provide power to the load from the electrical grid 214 (or from the fuel cell segment 206A through the AC grid 108) or through the at least one second inverter 202A. The controller 210B may determine a state of the power modules 206 and select a source to power the load 110 based on the state of the power modules 206, as described in U.S. patent application Ser. No. 13/279,921, filed on Oct. 24, 2011, which is incorporated herein by reference in its entirety.

A second switch 106 (e.g., the AC grid circuit breaker shown in FIG. 1) controls the electrical connection between the IOM 204 and the AC grid 108. Switch 106 may controlled by the controller 210B or by another system controller.

By way of illustration and not by way of limitation, the system contains the following electrical paths:

A path to the load 110 from the AC grid 108.

A path from the AC grid 108 through the IOM 204 to storage elements 206C of power modules 206 (for example, supercapacitors or batteries). In some embodiments a portion of the path between the IOM 204 and the AC grid 108 may include the electrical bus(es) 112.

A path from the storage elements 206C of the power modules 206, over the DC bus 212 to the IOM 204 and the UPM 202 in parallel. The DC bus delivers DC to the inverter 202A in the UPM 202 and/or to the inverter 204A in the IOM 204. The inverter 202A in the UPM 202 or inverter 204A in IOM 204 delivers AC power to the load 110 depending on the position of the switch 210A.

A path from the power modules 206 (which may include power from the fuel cell segment(s) 206A and/or the storage elements 206C of the power modules 206), over the DC bus 212 to the IOM 204 and the UPM 202. The DC bus 212 delivers DC voltage to the inverter 202A in the UPM 202 and/or to the inverter 204A in the IOM 204. The inverter 202A in the UPM 202 delivers AC power to the load 110. Power in excess of the power required by the load 110 is delivered to the AC grid 108 through an inverter 204A in the IOM 204. In some embodiments a portion of the path between the UPM 202 and the load 110, and/or the path between the IOM 204 and the AC grid 108 may include the electrical bus(es) 112. The amount of power that is delivered to the AC grid 108 will vary according the demands of the load 110. If the amount of power required by the load 110 exceeds the power provided by the power modules 206, the additional power demand may be supplied by the AC grid 108 directly to the load 110 through switch 210A in the first position or to the UPM 202 with the switch 210A in the second position. The AC grid power is rectified in rectifier 202C in UPM 202 and provided to the inverter 202A in the UPM 202 and converted back to AC for powering the load 110.

The overvoltage snubber 104 may be connected on the paths from the power modules 206 to the load 110. As described above, the overvoltage snubber may be configured to reduce the magnitude of AC flow to the load 110. Thus, the overvoltage snubber 104 may be connected to a circuit path between an AC power source and the load 110. As the electrical power system may deliver AC power to the load via the paths connecting the power modules 206 to the load 110 via the UPM 202, or via the TOM 204 and the AC grid 108, the overvoltage snubber 104 may be disposed within the electrical power system such that it may intercept the AC power received by the load 110 via either path. In an embodiment illustrated in FIG. 2, the overvoltage snubber 104 may be connected in parallel to a common portion of both paths, between the switch 210A, which may function to merge the paths, and the load 110. In such a configuration, regardless of the path via which the AC is delivered to the load, the overvoltage snubber 104 may intercept any excess AC directed toward the load 110.

Figure 3:
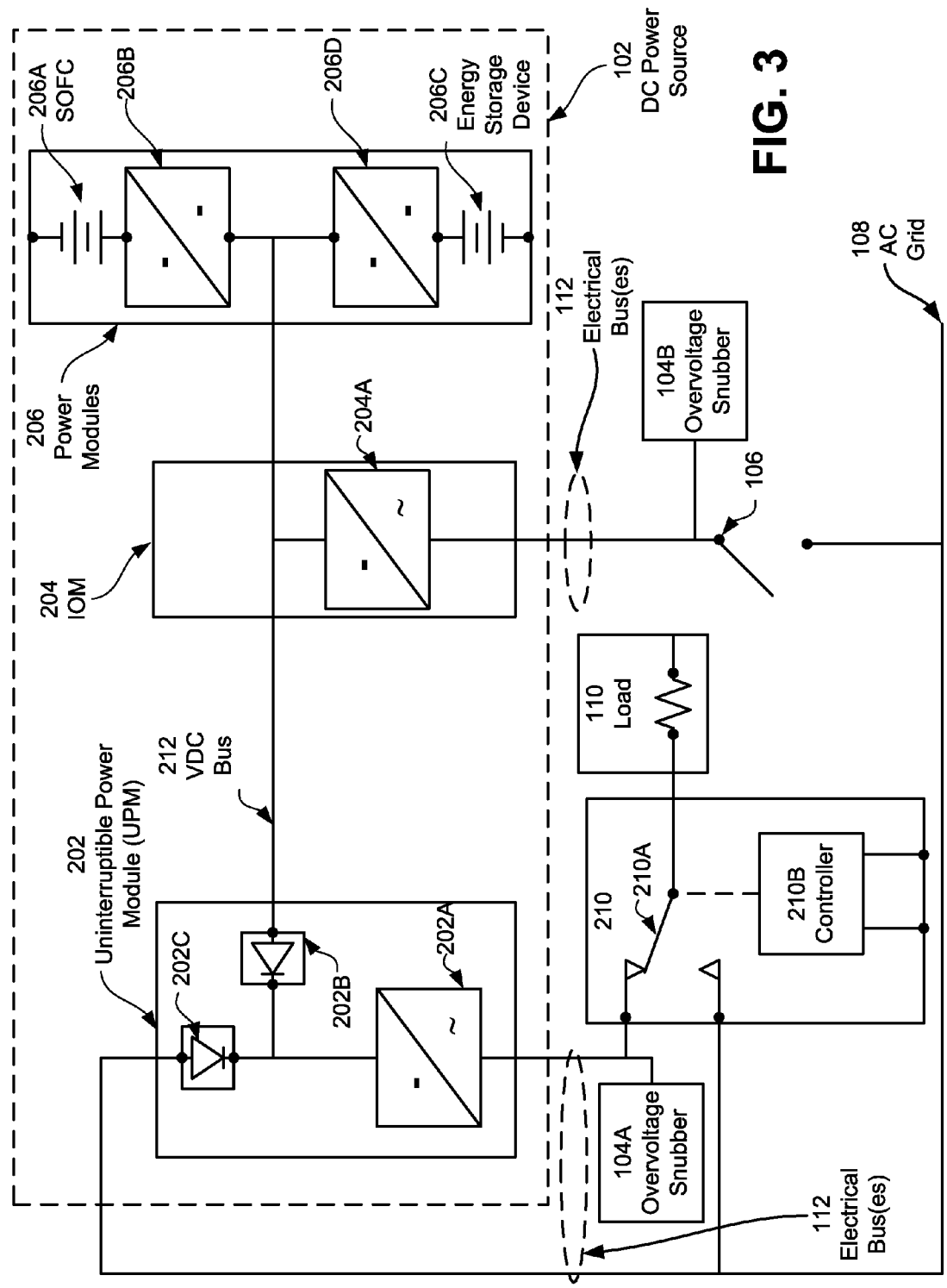
FIG. 3 is a block diagram illustrating a system including multiple overvoltage snubbers according to an embodiment.

Referring to FIG. 3, the DC power source 102, as illustrated in FIG. 2 and described above, may be connected to the load 110 via multiple paths, and respective overvoltage snubbers 104A and 104B may be connected to the multiple paths. Rather than a single overvoltage snubber 104, as in FIG. 2, multiple overvoltage snubbers 104A and 104B may be disposed within the electrical power system to intercept excess AC directed toward the load 110 from the DC power source 102 along different paths. In an embodiment, the DC power source 102 may deliver AC power via a path connecting an output of the TOM 204 to the load 110. For example, DC power may be delivered to the TOM 204 via the DC bus 212, and AC power may be delivered from the TOM 204 to the load 110 via the electrical bus(es) 112 and/or the AC grid 108. Thus, in an embodiment, this path may include the AC grid 108. As described above, the TOM 204 may include an inverter 204A which may convert the DC power provided by the power modules 206 to AC power. Therefore, one overvoltage snubber 104B may be connected to this path between the TOM 204 and the load 110 to intercept the excess AC power directed toward the load 110.

In an embodiment, the DC power source 102 may deliver AC power via a path connecting an output of the UPM 202 to the load 110. As described above, the UPM 202 may include an inverter 202A which may convert the DC power provided by the power modules 206 to AC power. The AC power may be delivered from the UPM 202 to the load 110 via the electrical bus(es) 112. Therefore, another overvoltage snubber 104A may be connected to this path between the TOM 204 and the load 110 to intercept the excess AC power directed toward the load 110.

The examples described in FIGS. 2 and 3 are meant to be non-limiting. Regardless of the number of paths between the DC power source 102 and the load 110, and the configuration of the DC power source 102, it may be understood that one or more overvoltage snubbers 104 should be disposed within the electrical system such that the overvoltage snubber(s) 104 are connected between the load 110 and a component for converting the DC power from the DC power source 102 to AC power. This may apply to any number of electrical power systems and circuits. Other examples of the electrical power systems may include those described in U.S. patent application Ser. No. 13/279,921, filed on Oct. 24, 2011, which is incorporated herein by reference in its entirety.

Figure 4:
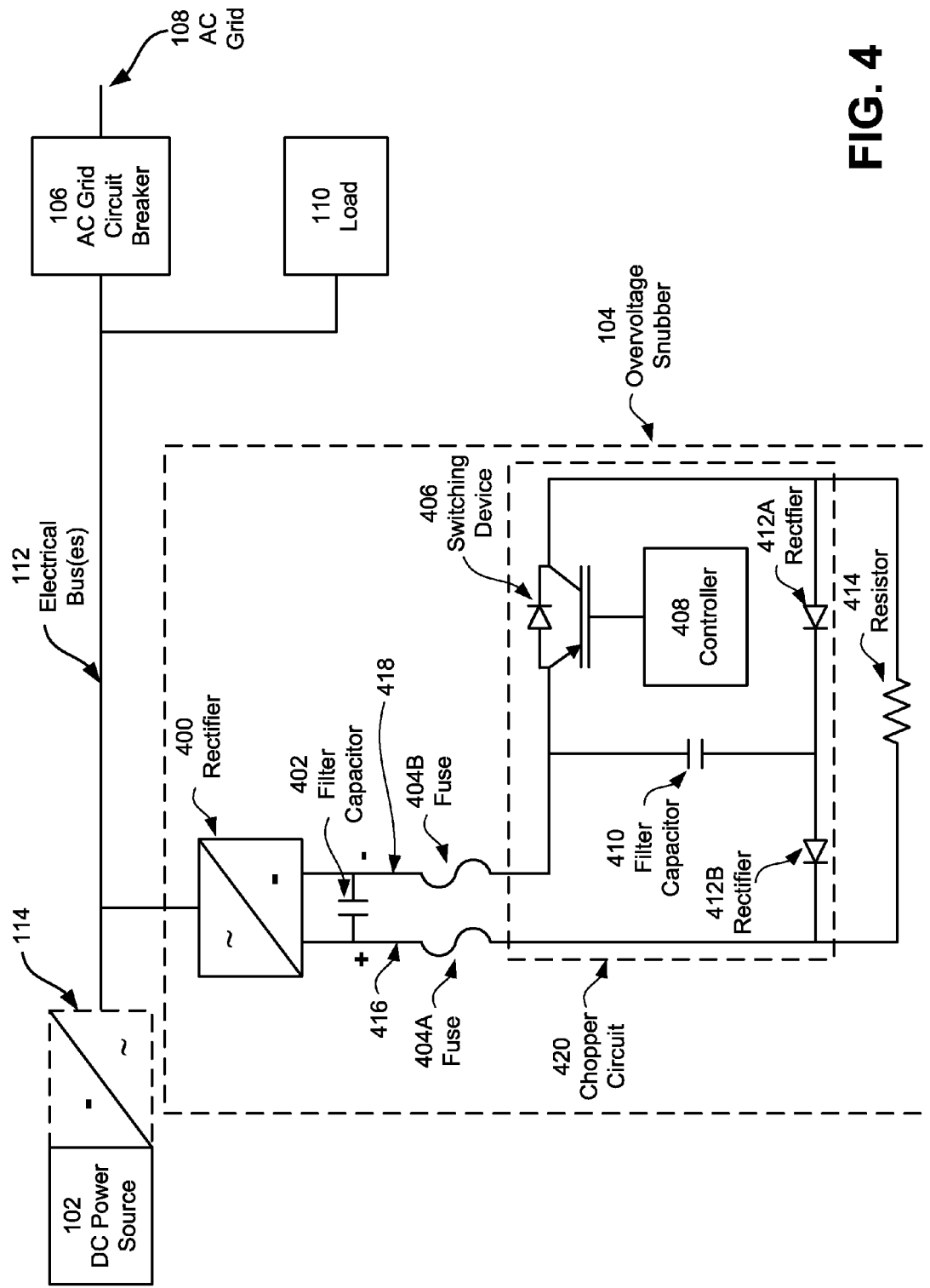
FIG. 4 is a block diagram illustrating an overvoltage snubber according to an embodiment.

FIG. 4 illustrates the components of one embodiment overvoltage snubber 104. Referring to FIG. 4, the overvoltage snubber 104 may be connected to a circuit between at least the DC power source 102 (including the DC/AC inverter 114) and the load 110, and in some embodiments the AC grid 108 via the AC grid circuit breaker 106. In an embodiment, the DC power source 102 may be connected to the circuit via a separate DC/AC inverter 114. The overvoltage snubber 104 may include multiple components for siphoning AC power from the overvoltage directed to the load 110 from the DC power source 102, and stepping-down and/or dissipating the excess power. In an embodiment, the overvoltage snubber 104 may include a rectifier 400 (e.g., an AC/DC converter, such as a three phase diode bridge rectifier/converter) connected to the electrical bus(es) 112 and the other components of the overvoltage snubber 104. These other components may include one or more filter capacitors 402 and 410, one or more fuses 404A and 404B, a switching device 406, a controller 408, one or more rectifiers 412A and 214B (e.g., diode rectifiers), and a resistor 414. Various combinations of these or similar components may embody a chopper circuit 420 within the overvoltage snubber 104 as described further herein.

The rectifier 400 may convert the overvoltage siphoned from the electrical bus(es) 112 from AC to DC power. The portion of the overvoltage drawn into the overvoltage snubber 104 may be considerable given that the overvoltage may include enough excess power to support the AC grid 106. Such power may be sufficient to cause damage to the components of the overvoltage snubber 104, particularly if the overvoltage snubber 104 was previously in a no charge state at the time. Drawing power from the overvoltage may cause an inrush current in the overvoltage snubber 104, and the sudden increase in power may stress the components of the overvoltage snubber. To alleviate the strain caused by drawing from the overvoltage, the overvoltage snubber may include a pre-charge circuit, such as a filter capacitor 402 connected to the DC side of the rectifier 400 between positive 416 and negative 418 buses output from the DC side of the rectifier 400. The filter capacitor 402 may slow the increase in power in the overvoltage snubber 104 compared to a sudden spike in power. While the filter capacitor 402 charges, a reduced amount of power may propagate through the rest of the overvoltage snubber 104. As the filter capacitor 402 becomes increasingly charged, more of the power may become available to the rest of the overvoltage snubber 104. Thus, charging the filter capacitor 402 slows the increase in power throughout the overvoltage snubber 104 allowing the other components to warm up before operating at a high capacity of eclectic power relative to their capacity limits. The filter capacitor 402 that may also smooth the various DC voltages of the overvoltage snubber 104 described herein by storing energy. In other embodiments, other known configurations of pre-charge circuits may be used in place of or in combination with the filter capacitor 402.

Other protective components may be included in the overvoltage snubber 104 to protect it from damage of the sudden increase in power. Fuses 404A and 404B, may be connected to the DC side of the rectifier 400 (e.g., located on a respective output bus 416, 418). The fuses may be configured to interrupt the connection between components of the overvoltage snubber 104 and the bus(es) 112 should the power drawn into the overvoltage snubber 104 exceed a threshold of the fuses 404A and 404B. In response to the power drawn into the overvoltage snubber 104 exceed the threshold of the fuses 404A and 404B, one or more of the fuses 404A and 404B may deform causing an interruption in the electrical circuit of the overvoltage snubber 104 that would not allow for the flow of current through the overvoltage snubber 104. The threshold of the fuses 404A and 404B may be selected such that they deform before a power level harmful to the other components of the overvoltage snubber 104. To regain the functionality of the overvoltage snubber 104, the deformed fuse 404A and/or 404B may require replacing or resetting. In other embodiments, circuit breakers (e.g., relays) may be used instead of or in combination with the fuses 404A and 404B.

To control drawing the overvoltage from the bus(es) 112 into the overvoltage snubber 104, the chopper circuit 420 may be located on the bus 418 and configured to open and close the circuit in the overvoltage snubber 104. In an embodiment, the circuit in the overvoltage snubber 104 may include buses 416 and 418 connected via the chopper circuit 420 and the resistor 414. In an embodiment, the chopper circuit may include a variety of known DC to DC converters. In response to the circuit in the overvoltage snubber 104 being closed by the chopper circuit 420, the overvoltage may flow into the overvoltage snubber 104. In response to the circuit in the overvoltage snubber 104 being opened by the chopper circuit 420, the overvoltage may bypass the overvoltage snubber 104. The chopper circuit 420 may be configured to respond to an overvoltage by opening and closing the circuit in the overvoltage snubber 104 at a designated frequency and/or for a designated time. In an embodiment, the frequency and/or time may be constant regardless of the level of the overvoltage or variable based on the level of the overvoltage. In operation the chopper circuit 420 may allow the overvoltage snubber 104 to draw bursts of the overvoltage from the bus(es) 112. In an embodiment, the chopper circuit 420 may operate to draw the overvoltage for a time similar to the time it may take the DC power source 102 to realize that it is no longer tied to the AC grid 110 and adjust its power output. For example, the chopper circuit 420 may operate to draw bursts of the overvoltage from the bus(es) 112 for approximately three cycles. The operation of the chopper circuit 420 may be dictated by a controller 408 connected to the switching device 406. The switching device 406 may be included as part of the chopper circuit 420 connected between buses 416 and 418. The switching device 406 may be embodied by a variety of known electronic switching devices and circuits (e.g., an insulated gate bipolar transistor and diode connected in a parallel circuit, or a full or half H-bridge). The controller 408 may signal to the switching device 406 causing the switching device 406 to open and/or close. The switching device 406 may have a neutral state, either open or closed, and the signal from the controller 408 may cause the switching device 406 to switch to the other state. In an embodiment, the controller 408 may use multiple signals to induce different states in the switching device 406.

Another component of the chopper circuit 420 may include a filter capacitor 410, similar to the filter capacitor 402. The filter capacitor 410 may be connected across (i.e., in parallel to) the switching device 406, connected to an input and an output of the switching device 406. The filter capacitor may serve a similar function and operate in a similar manner as the filter capacitor 402 described above. In other embodiments, other known circuits or components may be used in place of or in combination with the filter capacitor 402. In an embodiment, such another circuit of component may include a second switching device, similar to the switching device 406.

The output of the switching device 406, a variable DC flow, may be split among one or more rectifiers 412A and 412B connected in series, and a resistor 414. The series of rectifiers 412A and 412B, which may be included in the chopper circuit 420, and the resistor 414 may be connected in parallel. For example, the series of rectifiers 412A and 412B and the resistor 414 may be connected at one end to the output of the switching device 406 and to the bus 416 at another end. The split variable DC flow may be characterized as two lower current DC flows. Based on the configuration of the rectifiers 412A and 412B and the resistor 414, portions of the variable DC flow will flow along the different parallel paths to the rectifiers 412A and 412B and to the resistor 414. The rectifiers 412A and 412B may serve multiple purposes including stepping-down the current of the variable DC flow and smoothing out the variable DC flow so that it becomes a more constant DC flow. The resistor 414 may dissipate energy from the variable DC flow, mainly though heat loss caused by the resistance to the DC flow, thereby reducing the energy of the variable DC flow. In an embodiment, the resistor 414 may be configured to dissipate all of the energy of the portion of the variable DC flow which flows to the resistor 414. In an embodiment, the variable DC flow may be shunt to a ground (not shown) to reduce the power on the bus(es) 112. The lower energy variable DC flow resulting from the reduction by the rectifiers 412A and 412B and the resistor 414, may be returned to the electrical bus(es) 112 via the rectifier 400 and the bus 416 as a stepped-down or snubbed AC flow.

The stepped-down AC flow may be reduced to a level that is manageable for the load 110. For example, when losing the connection to the AC grid 108, the output of the DC power source 102 may exceed a maximum level for the load 110. The maximum level for the load 110 may be, for example, 120% of the root mean square of a nominal voltage. The output of the DC power source 102 may exceed the maximum level and reach, for example, 150% of the root mean square of a nominal voltage. The overvoltage snubber 104 may siphon the overvoltage from the bus(es) 112 and step-down the power of the overvoltage such that is does not exceed the maximum level for the load 110.

It should be understood that in the above descriptions of the figures, that multiple components may be replaced by similar components which may server similar purposes. Further, single components may be replaced by multiple of the same component having a lower rating where the multiple components together accomplish the same objective as the single component, and vice versa. Moreover, the arrangements of the components are not meant to be limiting, and various other arrangements may be used to accomplish the same objectives.

Figure 5:
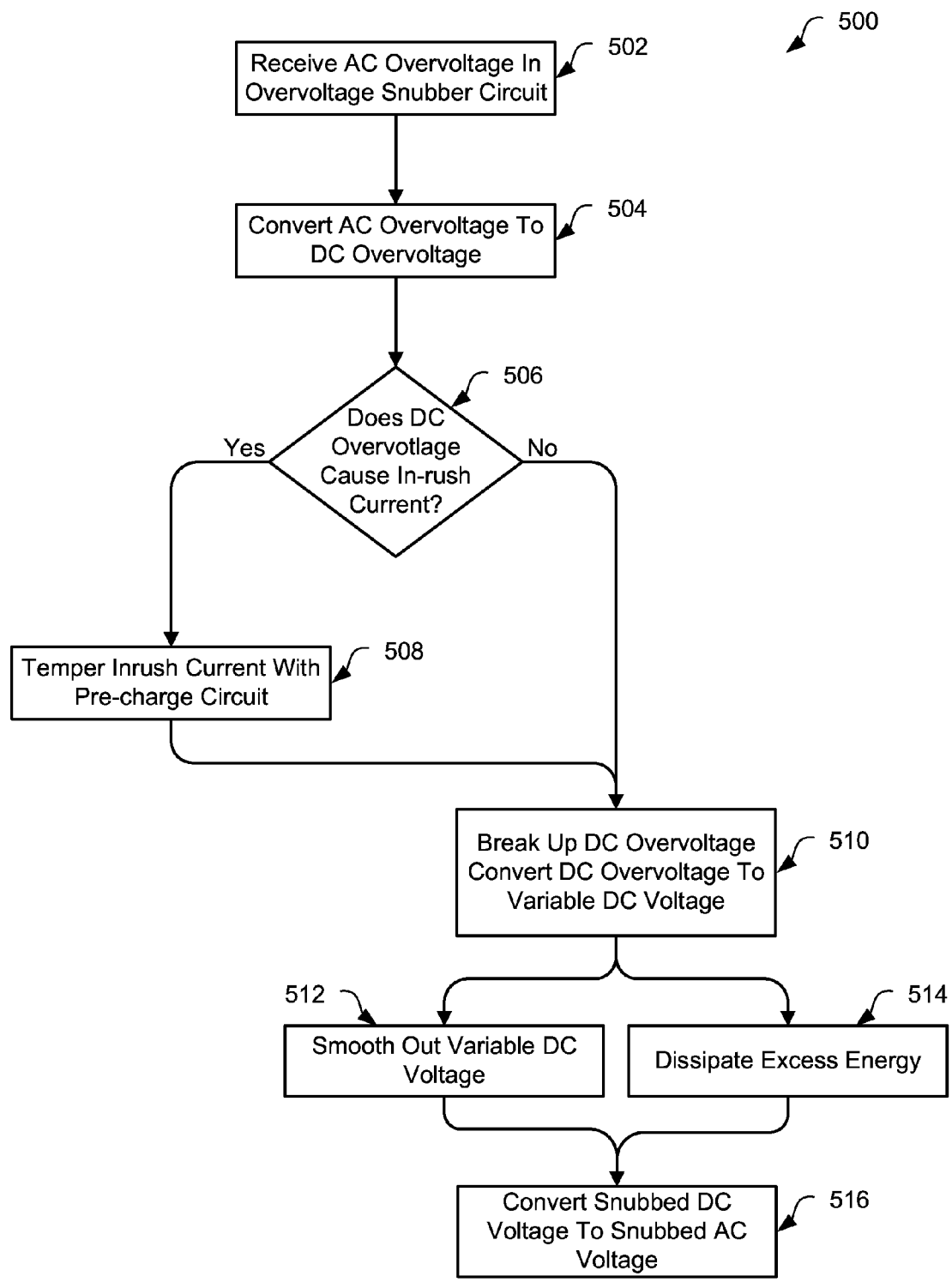
FIG. 5 is a process follow diagram illustrating a method for overvoltage snubbing according to an embodiment.

Regarding FIG. 5, a method 500 for overvoltage snubbing according to an embodiment may be implemented by the overvoltage snubber as described above. In block 502 the overvoltage snubber may receive an AC overvoltage. As described above, the AC overvoltage may result from a converted DC flow from a DC power source being provided to a load and AC circuit. The connection between the DC power source and the AC circuit may be interrupted, for example by opening the AC circuit breaker, resulting in the combined AC power flow for both the AC circuit and the load to be delivered to the load. The combined AC power flow may be the AC overvoltage which may be characterized by a magnitude greater than what the load is configured to handle, and may result in damage to the load. The overvoltage snubber, connected to the electrical bus between connections to the DC power source and the load may siphon at least some of the AC overvoltage from the electrical bus. To receive the AC overvoltage, the chopper circuit of the overvoltage snubber may repeatedly close and open the chopper circuit to complete the circuit of the overvoltage snubber allowing the AC overvoltage to flow into the overvoltage snubber.

For the overvoltage snubber to reduce the AC overvoltage to a level manageable by the load, in block 504 the overvoltage snubber may convert the AC overvoltage to a DC overvoltage. In an embodiment, the overvoltage snubber uses a reversible AC/DC converter/rectifier 400 to convert the AC overvoltage to a DC overvoltage to allow for the use of the DC chopper circuit 420.

The siphoning of the AC overvoltage from the electrical bus may cause an inrush current in the overvoltage snubber that may damage the overvoltage snubber. Therefore, in determination block 506, the overvoltage snubber may determine whether the DC overvoltage, converted above from the AC overvoltage, causes an inrush current in the overvoltage snubber. The determination of whether the DC overvoltage causes an inrush current in the overvoltage snubber may be an active or passive determination. In an embodiment, the overvoltage snubber may include components, such as programmed processing devices, to analyze the DC overvoltage and illicit the proper response to protect the overvoltage snubber from damage. In an embodiment, the overvoltage snubber may include passive components, such as the filter capacitor 402, 410 or resistor, which may slow the rise of a voltage level within the overvoltage snubber based on the electrical characteristics of the passive components and the voltage level of the DC overvoltage. For example, the filter capacitor may have capacitance characteristics such that when a DC overvoltage is introduced into the overvoltage snubber, the filter capacitor may use at least some of the DC overvoltage to start filling its potential electrical storage capacity before allowing the full DC overvoltage to reach other components of the over voltage snubber. This may result in a gradual increase in the amount of the DC overvoltage that reaches the other components until the filter capacitor is full. As the filter capacitor fills its potential electrical storage, it may draw less power from the DC overvoltage thus allowing more of the DC overvoltage to reach the other components of the overvoltage snubber. In response to the determining that the DC overvoltage does cause an inrush current (i.e. determination block 506="Yes"), the overvoltage snubber may temper the inrush current to manageable level for its components in block 508 (e.g., temper the inrush current with a pre-charge circuit that includes filter capacitor(s) 402, 410 and/or resistor(s)). The overvoltage snubber may continue to block 510 to break up the DC overvoltage converting the DC overvoltage to a variable DC voltage as described below.

In response to the determining that the DC overvoltage does not cause an inrush current (i.e. determination block 506="No"), the overvoltage snubber may break up the DC overvoltage the DC overvoltage to a variable DC voltage in block 510. In an embodiment, the overvoltage snubber may break up the DC overvoltage by repeatedly interrupting the flow of the DC overvoltage causing gaps in the flow of the DC overvoltage. This may be achieved through the use of a switching circuit, such a chopper circuit 420 including switching device 406, which opens and closes the overvoltage snubber circuit. As described above, this opening and closing of the overvoltage snubber circuit also allows the overvoltage snubber to draw the DC overvoltage from the electrical bus(es). The opening and closing of the circuit may be controlled by a controller that may signal the switching device to switch to an open or closed state. In an embodiment, the switching device may have a neutral state that is either open or closed and the signal may prompt the other state. In an embodiment, either state may be prompted by a signal or lack of signal from the control load. The chopper circuit may convert the DC overvoltage to an output of a variable DC voltage. The variable aspect of the variable DC voltage may be the result of breaking up the DC overvoltage by interrupting its flow. In a time domain, for example, the DC overvoltage may have a steady voltage or current over time, whereas the variable DC voltage may have a variable voltage or current over time. The variable DC voltage may vary between the DC voltage or current value of when the circuit is closed and approximately 0V or 0A when the circuit is open. The variable characteristic of the variable DC voltage may be represented as a square waveform on a time domain graph and may resemble an AC voltage, except for the square versus sine wave characteristics.

In block 512, the variable DC voltage may be smoothed out to produce a more constant variable DC voltage. In an embodiment, the overvoltage snubber may employ a rectifier or multiple rectifiers in series, such as diode rectifiers 412A, 412B, to step down and/or smooth out the variable DC voltage. Since the variable DC voltage may resemble an AC voltage a rectifier may be used to reproduce a more constant variable DC voltage. In an embodiment the overvoltage snubber may employ one or more filter capacitors that may smooth the DC voltage by storing energy. In an embodiment, a combination of the rectifier(s) and the filter capacitor(s) may be employed to smooth out the variable DC voltage. In block 514, the overvoltage snubber may dissipate excess energy of the variable DC voltage above the designated threshold. In an embodiment, the overvoltage snubber may employ one or more resistors 414 configured to reduce the variable DC voltage to at least the designated threshold. The resistor(s) may be rated to impose limits on the current flow and/or voltage in the overvoltage snubber circuit such that they approximate the designated threshold for such values. The resistor(s) may apply electrical resistance to produce heat energy from the interaction of the variable DC voltage and the electrical resistance. The heat energy may be dissipated from the resistor(s) reducing the amount of electrical energy output by the resistor(s). The combined output of the rectifier(s) and the resistor(s) may compose the more constant variable DC voltage. In an embodiment, the resistor(s) may be configured to dissipate all of the energy of a portion of the variable DC flow such that the only the output of the rectifier(s) composes the more constant variable DC voltage.

In block 516, the overvoltage snubber may convert the variable DC voltage to a snubbed AC voltage using the rectifier 400. The snubbed AC voltage, being the product of the interactions of the AC overvoltage with the overvoltage snubber, may be an AC voltage approximately at or below the designated threshold, which is sufficiently low for the load 110 to manage. The snubbed AC voltage may be supplied from the overvoltage snubber to the bus(es) 112 and then the load 110 while the connection between the DC power source 102 and the AC grid 108 remains interrupted.

The above described methods and systems can be readily used with multiple generators in parallel with a large load, while allowing tight control of frequency and voltage.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Further, words such as "thereafter," "then," "next," etc. are not intended to limit the order of the steps; these words are simply used to guide the reader through the description of the methods.

One or more block/flow diagrams have been used to describe exemplary embodiments. The use of block/flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

Control elements may be implemented using computing devices (such as computer) comprising processors, memory and other components that have been programmed with instructions to perform specific functions or may be implemented in processors designed to perform the specified functions. A processor may be any programmable microprocessor, microcomputer or multiple processor chip or chips that can be configured by software instructions (applications) to perform a variety of functions, including the functions of the various embodiments described herein. In some computing devices, multiple processors may be provided. Typically, software applications may be stored in the internal memory before they are accessed and loaded into the processor. In some computing devices, the processor may include internal memory sufficient to store the application software instructions.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

The preceding description of the disclosed embodiments is provided to enable any person skilled in the art to make or use the described embodiment. Various modifications to these embodiments will be readily apparent to those skilled in the art, and the generic principles defined herein may be applied to other embodiments without departing from the scope of the disclosure. Thus, the present invention is not intended to be limited to the embodiments shown herein but is to be accorded the widest scope consistent with the following claims and the principles and novel features disclosed herein.

What is claimed is:

1. An overvoltage snubber circuit configured to receive an alternating current (AC) overvoltage, comprising:
   a first rectifier configured to convert the AC overvoltage to a direct current (DC) overvoltage;
   a chopper circuit electrically connected to the first rectifier and configured to break up the DC overvoltage and to output a variable DC voltage; and
   a resistor electrically connected to the chopper circuit and configured to dissipate energy of the variable DC voltage,
   wherein the first rectifier is electrically connected to the resistor and configured to convert the variable DC voltage to a snubbed AC voltage,
   wherein the overvoltage snubber circuit is located in a fuel cell system comprising:
      a plurality of fuel cell modules are electrically connected to an inverter and configured to convert a DC voltage output of the plurality of fuel cell modules to an AC voltage,
      an electrical grid circuit breaker electrically connected to an electrical grid and configured to interrupt an electrical connection between the inverter and the electrical grid,
      a load configured to receive the AC voltage from the electrical grid and the inverter,
      an electrical bus configured to transmit the AC voltage, and configured to electrically connect the inverter, the electrical grid circuit breaker, the load, and the overvoltage snubber circuit in parallel, and
   wherein the overvoltage snubber circuit further comprises:
      the first rectifier electrically connected to the electrical bus on an AC side of the first rectifier and electrically connected to a positive bus and a negative bus on a DC side of the first rectifier,
      a pre-charge circuit electrically connected between the positive bus and the negative bus and electrically connected in parallel to an input of the chopper circuit via the negative bus, and
      the resistor having a first and a second end, the first end of the resistor electrically connected to an output of the chopper circuit and the second end of the resistor electrically connected to the positive bus.

2. The overvoltage snubber circuit of claim 1, wherein the pre-charge circuit is configured to reduce a rate of increase of power in the overvoltage snubber circuit in response to the overvoltage snubber circuit receiving the AC overvoltage.

3. The overvoltage snubber circuit of claim 1, further comprising a controller electrically connected to the chopper circuit and configured to signal the chopper circuit to change a state of the chopper circuit, wherein the chopper circuit is configured to induce the overvoltage snubber circuit to receive the AC overvoltage when the chopper circuit is in a closed state and configured to break up the DC overvoltage by switching between the closed state and an open state.

4. The overvoltage snubber circuit of claim 1, wherein the resistor is configured to dissipate energy of the variable DC voltage to approximately or below a designated threshold that indicates a power level manageable by the load.

5. The overvoltage snubber circuit of claim 1, further comprising a filter capacitor electrically connected to the chopper circuit and configured to smooth out the DC overvoltage by storing energy of the DC overvoltage.